July 5, 1932.  R. H. FLEET  1,865,749

AIRCRAFT

Filed June 11, 1930

Inventor
Reuben H. Fleet
By Maréchal & Noé
Attorneys

Patented July 5, 1932

1,865,749

UNITED STATES PATENT OFFICE

REUBEN H. FLEET, OF ABERDEEN, WASHINGTON, ASSIGNOR TO CONSOLIDATED AIRCRAFT CORPORATION, OF BUFFALO, NEW YORK, A CORPORATION OF DELAWARE

AIRCRAFT

Application filed June 11, 1930. Serial No. 460,497.

This invention relates to aircraft and more particularly to aircraft adapted for use on water.

One object of the invention is the provision of a water craft having laterally positioned inflatable floats on opposite sides of a main flotation body, and provided close to the water level to give stability to the craft when on water.

Another object of the invention is the provision of a water craft which is laterally stabilized by elongated explosive shells provided on opposite sides of the craft near the normal water level.

Other objects and advantages of the invention will be apparent from the following description, the accompanying drawing and the appended claims.

In the drawing

Figure 1:
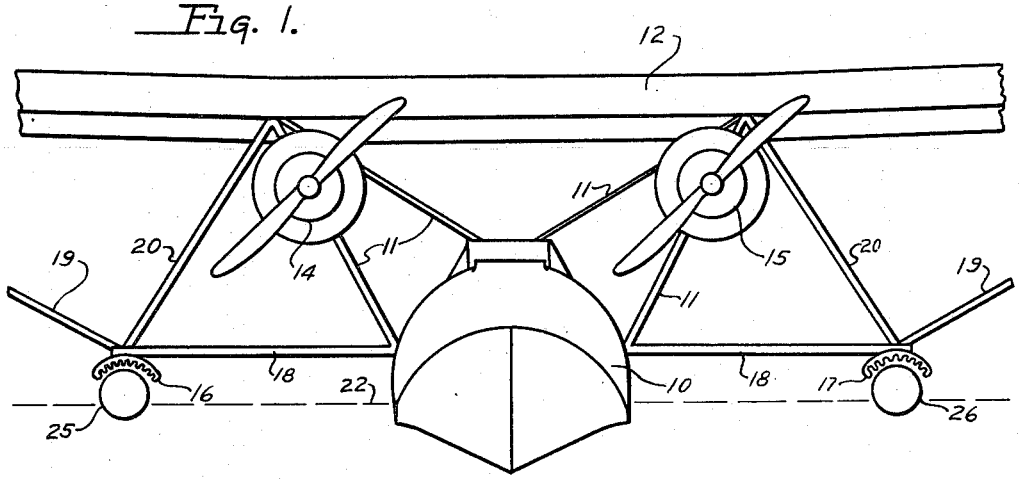
Fig. 1 is a front elevation of an aircraft embodying the present invention, the end portions of the sustaining surfaces being broken away.

Referring more particularly to the drawing, in which a preferred form of the invention is illustrated, the aircraft comprises a main flotation hull or body 10 adapted to support the pilot and passengers, the hull being connected by the brace members or struts 11 to the sustaining surface 12, which is shown as a monoplane surface above the level of the hull 10. The struts 11 also support the propelling power units 14 and 15 which may be arranged as shown just below the sustaining surface and at opposite sides of the longitudinal axis of the aircraft.

On each side of the main body 10 is an inflatable float. These two floats, designated generally 16 and 17, are supported by the laterally extending beams 18 and the struts 19 and 10, the struts 20 extending up to outer portions of the sustaining surface 12. The normal water level is indicated at 22, and it will be seen that the floats 16 and 17 are arranged at a level close to the normal water level so that at least a large portion of them are above the water to provide the necessary lateral stability for the aircraft, when the latter rests on the water. If one side of the airplane should tend to lower, the float on that side will be submerged, or partly submerged, thus keeping the aircraft in an upright position.

Figure 3:
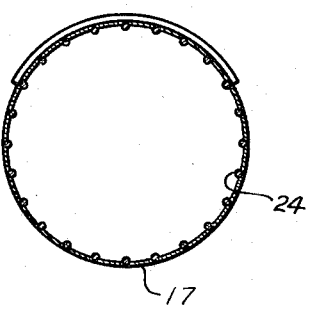
Fig. 3 is a detailed section of one of the floats in its inflated condition.

The two floats 16 and 17 are similar in construction. Each is formed of flexible rubberized fabric or the like so that they may be inflated. The upper side of each float is preferably of semi-rigid construction, having a series of transversely extending form defining ribs which impart a downwardly concave form to the upper side of the float, as shown in Fig. 1. The lower portion of the float does not have any transversely extending formers but may be collapsed to the position shown in Fig. 1, when the float is emptied of air. Both the upper and the lower sides of the float however are preferably provided with longitudinally extending formers or stays which are sewed or vulcanized into the float covering. These stays are indicated at 24 in Fig. 3 and define the longitudinal shape of the float, when the float is inflated. The floats may be simultaneously inflated by means of suitable pipe connections extending from a compressed air tank in the main hull. As shown in Fig. 1, when the floats are deflated, accomplished by a suitable suction pump provided in the fuselage, they are of downwardly concave form, offering very little resistance to the forward travel of the aircraft. When they are filled with compressed air at a definite pressure they assume a stream line shape of circular section as shown in Fig. 3.

Figure 2:
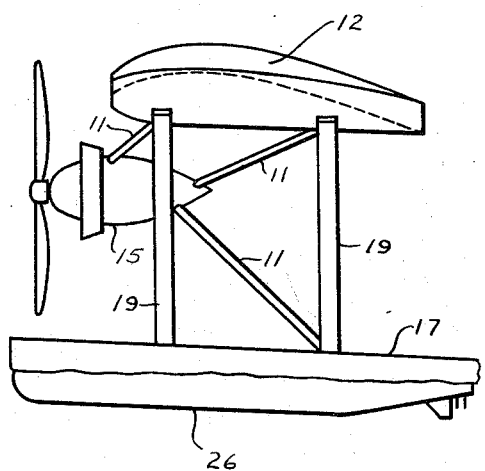
Fig. 2 is a side elevation of the aircraft.

Carried immediately adjacent each of the deflated or collapsed floats is an elongated explosive shell, which may be a torpedo or bomb, indicated at 25 and 26. The bomb or torpedo is preferably of a length commensurate with the length of the float, and is carried normally so that it is partly housed within the concave portion of the deflated float, as shown in Figs. 1 and 2. The torpedoes or bombs 25 and 26 are supported by suitable straps, not shown, which are connected to the frame struts 18, 19 and 20 in any suitable manner. Means are provided so that these shells 25 and 26 may be released from the aircraft.

It will be understood that the two torpedoes or bombs 25 and 26 are positioned on opposite sides of the main body 10 adjacent the water level and preferably just above the normal water line. When the aircraft is resting on the water neither of the shells will be totally submerged but they afford the desired lateral stability for the aircraft, for as soon as one side of the aircraft should fall, the float on that side would be submerged while the float on the other side of the air craft would be out of water, the result being that the aircraft is maintained in its normal upright position at all times. After the aircraft rises from the water it may drop the bombs or torpedoes and can then fly along with the floats deflated in which condition they offer little resistance to forward flight. Before landing on the water again the floats can be inflated with compressed air and the flotation effect of the floats then provides the lateral stability on the water. Obviously the torpedoes or bombs may be used to provide lateral stability on the water without the inflatable floats.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a main flotation body, a sustaining surface therefor, laterally positioned inflatable floats spaced from opposite sides of said body, and an elongated explosive shell carried below each of said floats.

2. In an aircraft, a main flotation body, a sustaining surface therefor, inflatable floats spaced from and positioned on opposite sides of said body, said floats being collapsible so as to have a downwardly concave form in collapsed condition, and an elongated explosive shell carried immediately below each of said collapsed floats and partly housed therein.

3. In an aircraft, a main flotation body, a sustaining surface therefor, and laterally positioned inflatable floats arranged at opposite sides of said body at a level just above the normal water line, said floats being normally collapsed, and an elongated explosive shell carried immediately adjacent each of said floats in stream lined continuation thereof.

4. In an aircraft, a main flotation body, a sustaining surface therefor, and laterally positioned elongated explosive shells detachably carried at opposite sides of said body and spaced therefrom at points close to the normal water level to provide for lateral stability of the aircraft while on the water.

In testimony whereof I hereto affix my signature.

REUBEN H. FLEET.